Inventor
ERNST KARWAT

By Toulmin & Toulmin
Attorneys

United States Patent Office 3,327,487
Patented June 27, 1967

3,327,487
PROCESS AND APPARATUS FOR THE PRODUCTION OF AMMONIA SYNTHESIS GAS FROM HYDROGEN CONTAINING GAS MIXTURES
Ernst Karwat, Pullach im Isartal, Germany, assignor to Linde Aktiengesellschaft, Munich, Germany
Filed Mar. 17, 1964, Ser. No. 352,685
Claims priority, application Germany, Mar. 21, 1963, G 37,327; Mar. 11, 1964, G 40,059
28 Claims. (Cl. 62—13)

This invention relates to a method and apparatus for the production of ammonia synthesis gas by fractionation of hydrogen-containing gaseous mixtures under pressure and at low temperatures, and then scrubbing out the residual impurities such as $CH_4$, $CO$ and $O_2$ from the remaining gaseous hydrogen by means of liquid nitrogen.

For the production of gaseous mixtures containing hydrogen, which hydrogen is to be used later for the ammonia synthesis, several methods are possible, reference being directed to, among others, Industrial Chemicals, Faith et al., 2nd Ed., 1957, Wiley, N.Y., Chapman & Hall, London, pp. 81, 440–450 and Kirk-Othmer Encyclopedia of Chemical Technology vol. 2, 1963, Wiley, pp. 274–5. For example, by gasification of solid or liquid fuels or by oxidation of hydrocarbons with subsequent shifting of the carbon monoxide, gaseous mixtures are produced which, besides hydrogen, also contain considerable $CO_2$, variable quantities of nitrogen and significant amounts of methane, carbon monoxide, etc.

Aside from eliminating the aforementioned impurities steps are necessary for the removal of sulfur compounds, especially those of an organic nature, which would poison the catalysts. Thus, in a plurality of steps, each of which requires a different procedure, apparatus and control, there is finally obtained the purification of the shifted gas for use as a $H_2$-$N_2$-mixture ready for $NH_3$-synthesis.

It is old to scrub out $CO_2$ by physical or chemical methods, and to this must be added the more costly step of scrubbing with a cuprous ammoniacal solution or a catalytic methanation for the removal of small amounts of $CO$ which, in the latter case, remain as methane in the synthesized gas.

The hydrogen for synthesis can also be produced by fractionation of coke-oven gas under pressure and at low temperatures. This likewise requires first a careful removal of the carbon dioxide and possibly sulfur compounds. All the impurities such as $CH_4$, $CO$ and $O_2$ are, however, removed in one deep cooling process, with the production of the purest synthesis gas after washing with liquid nitrogen. This method of producing synthesis gas from coke-oven gas in which heat exchange is effected in tubular heat exchangers has, however, the disadvantage of requiring more expensive apparatus and the expenditure of more energy than the modern method of producing synthesis gas from converter gas. (In the following, by "converter gas" any gas is meant that has passed through a shift reaction.)

On the other hand, washing with liquid nitrogen for the thorough purification of the synthesis gas is also done for the converter gas. Such an installation, however, has the disadvantage of requiring expensive equipment for first washing out the $CO_2$.

A principal object of this invention, therefore, is to provide a simplification of the purification of hydrogen-containing gaseous mixtures such as coke-oven gas and of shift gases and their subsequent conversion into a hydrogen-nitrogen mixture ready for synthesis, and to provide a fractionation method that can be used without substantial modification for initial gaseous mixtures as different from each other as coke-oven gas or nitrogen-containing converter gas.

Upon further study of the specification and claims other objects and advantages of the present invention will become apparent.

Consequently, the initial gaseous mixture can preferably have a composition within the following ranges:

| | 1 | 2 | 3 | 4 | 5 | 6 | 7 |
|---|---|---|---|---|---|---|---|
| | Coke oven gas, percent | Coke oven gas after partial oxidation with oxygen, percent | Steam Reforming of natural gas, percent | Steam Reforming of naphtha, percent | Steam Reforming of naphtha alternative, percent | Steam Reforming of naphtha alternative, percent | Shifted Gas, percent |
| $H_2$ | 52–60 | 65–68 | 73.2 | 62–70 | 60.5 | 60.5 | 70.1 |
| $N_2$ | 2–8 | 4–5 | 0.7 | 0.0 | 0.5 | 10 | 3.2 |
| $CO$ | 4–9 | 8–10 | 17.4 | 13–14 | 16 | 14.5 | 5.7 |
| $O_2$ | 0.2–0.3 | 0.2 | | | | | |
| $CH_4$ | 23–26 | 2–14 | 4.1 | 0.5–4 | 10 | 0.5 | 0.4 |
| $C_2H_4$ | 1.5–2.5 | ~1 | | | | | |
| $C_2H_6$ | 0.5–0.7 | | | | | | |
| $CO_2$ | 1.5–2.5 | 4–5 | 4.6 | 13–14 | 13 | 14.5 | 20.6 |
| $H_2S$ | 0.0–0.5 | 0.0–0.3 | | | | | |
| $C_3+$ | 0.2–0.3 | | | | | | |
| $C_6H_6$ | 0–30 g./Nm.³ | | | | | | |

Before describing the invention in detail, it is to be noted that the attached

The objects of the present invention, which comprise the production of $NH_3$-synthesis gas as well as of $CO$-free $H_2$-$N_2$ gas mixture, are achieved by cooling under pressure the hydrogen-containing gaseous mixture, in which hydrogen as a main constituent is accompanied by hydrocarbons, oxygen-compounds of carbon, nitrogen, moisture and impurities, thereby separating a substantial low temperature by partial condensation from a crude hydrogen fraction a fraction containing the bulk of the components other than hydrogen, and washing the crude hydrogen fraction with liquid nitrogen to form a $CO$-free gaseous mixture of hydrogen and nitrogen and simultaneously dissolving $CO$ in the liquid nitrogen, and, if necessary, adding gaseous nitrogen up to a 3:1 molar gaseous mixture of hydrogen and nitrogen. In this process said crude hydrogen fraction is heated from said substantial low temperature to ambient temperature and is then recooled in heat exchange with purified gases before it is subjected to the liquid nitrogen wash. In particular, said cooling step is conducted in a first one of at least three cyclically interchangeable regenerators; the crude hydrogen fraction is passed before being washed through at least one other of said regenerators, which has previously been cleaned of impurities, to heat said crude hydrogen fraction, and cool said other regenerator; and then the warmed crude hydrogen fraction is passed in indirect heat exchange relationship with the gaseous mixture of nitrogen and hydrogen from the washing step to recool said crude hydrogen fraction prior to being washed.

In this process the fraction of the revaporized condensate is combined with the revaporized sump of the washing column and is called in the following, "residual gas."

For the performance of this process use is preferably made of a regenerator system comprising three cyclically interchangeable regenerators each of which performs all the functions in cyclic order during successive switching periods. Instead of the regenerators, use can also be made of reversible heat exchangers of the kind used in refrigeration plants. Associated with this regenerator system there is also an expansion turbine. Other important parts of this installation are a washing column and several heat exchangers.

If the last step of the process is a wash with liquid nitrogen to free the hydrogen from its impurities, then the pure synthesis gas must not become contaminated while it is being heated.

In this invention the crude hydrogen, possibly after work-performing expansion, is warmed by the regenerator system to room temperature and is then again cooled in counter-current relation to a nitrogen-hydrogen mixture in an indirect heat exchanger, preferably tube-type, before being delivered to the washing column. This involves the deliberate sacrifice of the advantage of transferring the crude hydrogen directly from the cold end of a regenerator to the washing column, although after its separation from the feed gas, e.g. coke-oven gas, the crude hydrogen does have the low temperature, the purity and the pressure with which it is generally delivered to the washing column.

Deviations from this rule may exist when a significant proportion of evaporated sump liquid of the nitrogen washing column is used as surge gas and is thereby heated in a regenerator. As a balance, a heat equivalent amount of hydrogen must then be delivered from the cold end of the regenerator directly to the washing column, instead of to the regenerators, when the evaporated liquid amounts to over 2% of the crude gas.

In order that the crude hydrogen while it is being warmed in the third regenerator will completely purge all remaining vaporized condensates, it is advantageous to have it previously expanded for cold production, thereby increasing the volume with which it will pass through the regenerator. The crude hydrogen which is to be expanded still contains, after passage through the first regenerator condensable impurities such as $CH_4$, CO and $N_2$, but no $CO_2$. Before its expansion, a small partial stream, preferably about 1.5 to 2% by volume, can be diverted from the crude hydrogen, warmed, and then recombined with the main stream after the latter has cooled compressed nitrogen and was itself warmed thereby, so that with the crude hydrogen at an elevated starting temperature, its expansion can occur without the separation of any condensate. Its final temperature after expansion is a few degrees lower, e.g. about 3° C., than the temperature at which the crude hydrogen leaves the first regenerator.

The step of warming the crude hydrogen before its expansion with the help of the diverted partial stream is performed before the liquid nitrogen washing is put into operation, so that during the period when the washing column is idle, the regenerators themselves can be rendered cold. The hydrogen that is to be used for warming can also be taken from the crude hydrogen which has been warmed to room temperature and brought to synthesizing pressure, but would then require the removal of possible traces of water vapor and carbon dioxide.

An important feature of this new method is that the production of cold in the regenerators is coupled with the production of cold for the nitrogen wash. The preparation of the synthesis gases is greatly simplified if a portion of the cold that is contained in the crude hydrogen from the first regenerator is carried over to the previously compressed, precooled nitrogen to compensate for the loss of cold in the nitrogen washing column. This renders unnecessary the high-pressure nitrogen circulation that is usually present in such systems and instead of multiple-stage compression up to 80 to 200 atm., it is here necessary to use pressures of only about 13 atm. for the nitrogen which is, of course, an outstanding advantage of this invention.

By this method of operation, the production of cold is dependent on the amount of crude hydrogen delivered to the expansion turbine. If the stream of crude gas is throttled, the need for cold does not decrease as rapidly as the amount of gas. For compensation there is sent through the hydrogen expansion turbine, in addition to the separated crude hydrogen, also some circulating hydrogen which is diverted from the pressure side of the crude hydrogen compressor and is added to the crude gas before it enters the first regenerator.

If desirable, a closed circulation can also be provided for the nitrogen. This nitrogen for circulation is taken in the gaseous state from a separator ahead of the washing column, is returned through countercurrent heat exchangers to the nitrogen compressor, and from there passes through countercurrent heat exchangers to the cold end of the exchangers and back to the nitrogen separator. It warms the additional hydrogen contained in the hydrogen circulation.

Under full load the hydrogen expansion turbine can also supply cold to additional plants, e.g. to a preliminary fractionation plant, if the expansion is continued to a lower pressure. Naturally a corresponding compression prior to the compression of the crude hydrogen can be effected.

If synthetic $NH_3$ is to be produced from coke-oven gas, then by far the greater portion (85 to 95%) of the methane in the coke-oven gas is separated in the first regenerator. This step distinguishes the present invention from all prior methods of fractionating coke-oven gas: from classical processes using tubular countercurrent heat exchangers in that by the latter the components of the coke-oven gas are separated individually as $C_3$-, $C_2$-, methane and CO fractions during the deep cooling process and are usually obtained separately. This invention is also distinguished from those processes by which coke-oven gas is cooled in regenerators in that the cooling in those processes is ended when ethylene and carbon dioxide in addition to a small portion of the methane are condensed. In contrast to this invention, in the prior processes, separation of the methane does not occur until after the gases have left the regenerators and have been subjected to further cooling.

The revaporization of the condensate, e.g. during the treament of coke-oven gas, should be mentioned here. The treatments of hydrogen-containing mixtures other then coke-oven gas will be described later. Although $CO_2$ and nitrogen are then usually the impurities rather than methane and nitrogen, nevertheless the process steps are so similar that the revaporization of the condensate from coke-oven gas can be referred to as being of general applicability.

At the end of the loading period of the first regenerator, before the vaporization of the deposited condensate, the regenerator contains, besides the condensate, also a considerable amount of gaseous hydrogen, which however, may not return together with the condensate into the residual gas, but must be added to the crude hydrogen.

For this purpose, before the revaporization of the condensate, the $H_2$ content of this regenerator is delivered through its cold end and introduced into the two other regenerators until the pressures have been equalized, and the remaining gas portion with further reduction of pressure is delivered through the warm end of the regenerator to the suction conduit leading to the crude-gas compressor as long as this remaining gas is still rich in hydrogen.

Now a valve is opened at the warm end of this regenerator, thereby connecting the regenerator to the residual gas conduit. Condensates such as $CH_4$ which were deposited at higher than atmospheric pressure will escape first, together with the last gas portion, thereby effecting the sublimation of $CO_2$ and $H_2O$ which were deposited in regions of higher temperature.

The revaporization of all condensates will be facilitated by reducing the pressure and by drawing them out with pressures below atmospheric. At the same time they can be purged by gases introduced from the cold end. The most suitable gas for this purpose is a vaporized $CO$-$N_2$ mixture from the sump of the washing column. If from this mixture, the amount that is passed through the regenerators instead of through the heat exchangers of the washing column is more than 2% of the amount of the crude gas, then an equal amount of hydrogen will have to be introduced directly into the washing column instead of into the regenerators to be warmed. This, of course, requires that the pressures in the regenerators and in the washing column be coordinated and should not involve more than 10 to 15% of the hydrogen produced.

An important advantage of this invention is that the same method and the same apparatus which are used for the treatment of coke-oven gas can also be used to obtain synthesis hydrogen from gases which contain only little methane but do contain $N_2$, $CO$ and much $CO_2$, with at least enough nitrogen for sublimation of the $CO_2$.

A further advantage of the process of this invention is that the same apparatus and procedure can be used for separating from hydrogen besides $CO_2$, also large amounts of nitrogen, such as are present in gas mixtures produced with air. Thus the long sought objective is reached of making available for $NH_3$ synthesis inexpensive gases such as mine gas (a mixture of air and methane), blast furnace stack gas, products of dust gasification or of vortex bed gasification, generator gas from ash-rich fuels, etc. It is preferable for this purpose to perform gasification and conversion under pressure, but also under such low pressures that sublimation of the $CO_2$ in the regenerators is assured and the required cold can still be provided.

In the production of synthesis gas from coke-oven gas there are various problems which would make it desirable to deviate from the above-described process. Such a problem arises in case of an inadequate supply of coke-oven gas for the production of a specified amount of synthesis gas. This has been an old problem and heretofore has been solved by oxidizing with $O_2$ or $H_2O$ the methane which is present in the crude gas or which has been separated therefrom by deep cooling, the methane being thereby converted into $CO$ and $H_2$. The $CO$ is then converted by steam into $H_2$ and $CO_2$, the latter being then washed out, and the hydrogen thoroughly cleansed, e.g., by deep cooling and washing with liquid nitrogen. Before such a deep cooling, the $CO_2$ is removed from the stream of gas by washing with water under pressure, and thereafter with an alkaline solution or at low temperatures with methanol or potash solution.

When these problems are handled according to the present invention, two partial currents are delivered to the regenerators, the first being a mixture of $H_2$ and hydrocarbons while the second is a mixture of $H_2$ with $CO_2$, $CO$ and $N_2$. The two partial currents are together separated into two fractions in the regenerators by pressure and cold, the first fraction being gaseous and containing practically all the hydrogen of the two partial streams and also residual amounts of $CH_4$, $CO$ and $N_2$, while the second fraction which forms the condensate in the regenerators contains all the remaining components of the two partial streams. The two fractions are then further treated as described.

Mixtures of $H_2$ and hydrocarbons which are used either alone or as the first partial stream for the performance of this process are, e.g., coke-oven gas, refinery gases, waste gases from hydrogenation plants, and products of the catalytic treatment of benzene, which contain sufficient hydrogen, to make the separation of it from the other components by pressure and cold in the regenerator economical.

The second partial current of $H_2$ and $CO_2$ can be produced by oxidative conversion of the hydrocarbons of the same kind of gas from which the first partial stream was produced, and with subsequent conversion of the $CO$, but can also be formed by other methods, e.g., by gasification of heavy fuel oil with oxygen and subsequent conversion. Coal, benzene or natural gas can be used initially as fuels, and for converting such fuels into gas, air or steam can be used instead of oxygen. Naturally it is possible with only an $H_2$-$CO_2$ mixture to perform this process, provided there is sufficient $N_2$ available for the sublimation of the $CO_2$.

To keep down the cost of the $H_2$-$CO_2$ stream, large amounts of non-reacted hydrocarbons can be permitted to remain in it, and similarly after the conversion with steam, a large amount of $CO$ can also remain in the gas, because excess $CH_4$ and $CO$ can be completely separated from hydrogen in the regenerator and in the washing column without additional expense.

During the production of nitrogen from the air for the $N_2$ wash, an equivalent amount of oxygen is produced. It is economically advantageous to produce the second partial stream with oxygen and to adjust the amount of such second stream according to the amount of available oxygen.

If steam is used for the oxidative conversion of the fuel to produce the second partial current and the necessary heat is produced by combustion of a portion of the residual gas, then there will be less heat available for outside use, with resulting difficulties in the sale of such residual gas.

By working with two partial currents, use is made of the gaseous components $CH_4$, $CO$ and $N_2$ which were separated at low temperatures from the first partial stream for the revaporization of the condensed $CO_2$. The revaporization of the $CO_2$ succeeds remarkably well, especially if it is assisted by low pressure and by a current of scavenging gas. Nevertheless, the crude hydrogen during the next switching period will take up a few parts per million of $CO_2$, and the latter must then be removed before the nitrogen wash.

An advantage of combining two partial streams which deposit different kinds of condensate is that these condensates are deposited separately from each other in the regenerators. If in the first partial current the impurities are mainly low boiling gases such as $CH_4$, $CO$ and $N_2$ while in the second partial stream they are high boiling gases such as $CO_2$ the regenerator will be loaded more uniformly with condensates over its length and throughout the temperature range than if only one stream of crude gas, e.g. coke-oven gas alone, were used.

In the process of this invention, the warm zone for condensation of the $CO_2$ and also the cold zone for condensation of the $CH_4$ are used, in accordance with the relative sizes of the partial streams. The different heats of vaporization of $CH_4$ and $CO_2$ correspond to the different specific heats of the regenerator packings in the two temperature ranges. For equal $H_2$ yields, the regenerators operating with added partial streams can generally be somewhat smaller than those which operate without partial streams. If, however, they are made equally large, which would increase the cost only in proportion to the increase in weight, then the regenerators can be used for crude gas, residual gas, fuel oil or coal, according to the market conditions.

By using two partial streams, there will be more freedom for choice of raw materials for gas production.

For best utilization of the residual gas, the relative sizes of the partial streams should be based upon their heats of combustion and densities.

The method of this invention can also be used for the production of hydrogen of high purity (98 to 99%) for the production of which the same starting substances can be used as for the production of $NH_3$-synthesis gas.

For the production of pure hydrogen, however, the final nitrogen wash is not used, but instead a system in which the impurities are removed from the hydrogen by deep cooling and condensation.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever. All "atmospheres" are expressed as metric atmospheres absolute.

EXAMPLE 1

*Fractionation of coke-oven gas ($H_2$-hydrocarbon mixture)*

Figure 1:
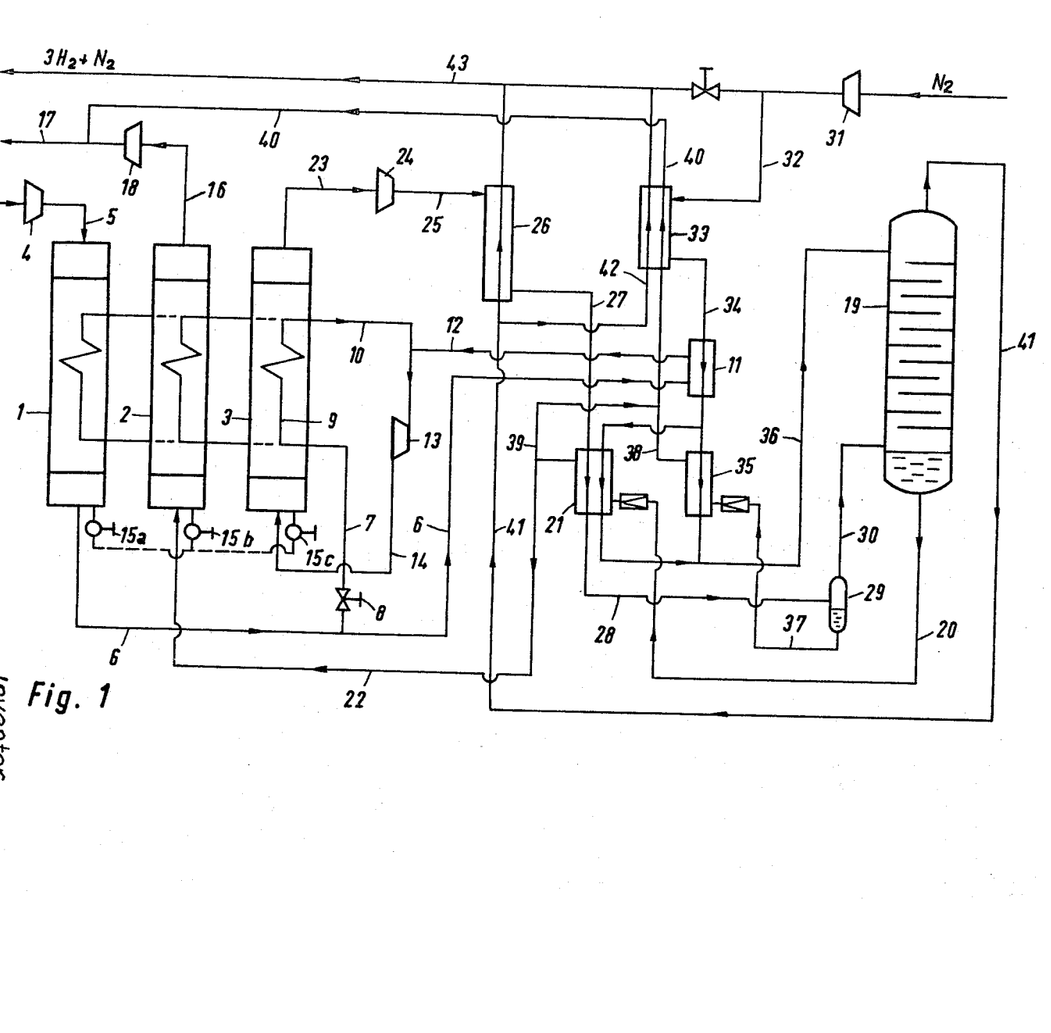
FIGURES 1, 1a and 2 are schematic flowsheets depicting preferred embodiments of this invention.

Referring now to FIGURE 1, it is seen that 1, 2 and 3 are three cyclically interchangeable regenerators or reversible exchangers used as cold accumulators and heat exchangers. Each regenerator passes in sequence through the same process steps as the other two: 53,000 Nm.³ coke-oven gas with 60% $H_2$ are compressed to 10 atmospheres by a compressor 4 and delivered by conduit 5 to the regenerator 1 to be cooled therein. The condensable ingredients including most of the methane are condensed, and the crude hydrogen which leaves the regenerator 1 through conduit 6 at a temperature of about 83° K. contains 90% $H_2$, 0.6% $CH_4$, 4% CO, 5% $N_2$ and 0.1% $O_2$. A diverted portion of about 2% is delivered through a valve 8 and conduit 7 to the coil 9 in which it is warmed. It is then delivered by conduit 10 to the main stream of crude hydrogen in conduit 12 after the latter has cooled the compressed nitrogen in the heat exchanger 11 while the crude hydrogen was warmed thereby. The crude hydrogen is expanded in turbine 13 to about a pressure of 3 atmospheres and is delivered by conduit 14 to the regenerator 3 in which it is warmed to ambient temperature and will carry with it residues of $CH_4$, $CO_2$ and $H_2O$.

During the cycle described above the regenerator 2 will be performing revaporization. Components with a higher condensation pressure such as $CH_4$ and some remaining hydrogen gas leave the regenerator first and thereby vaporize ethylene, ethane, carbon dioxide, water, etc. Finally, the blower 18 brings the pressure in the regenerator down to 0.5 atmosphere. The vaporization, especially of the methane, at the cold end of the regenerator 2, is accelerated by the fact that a CO-$N_2$ mixture from the sump of the washing column 19 is delivered to the regenerator through conduit 20 and heat exchanger 21 in which it is vaporized, and from there through conduit 22 to the regenerator 2, from the cold end of which it is decompressed.

The operation and switching over of the regenerators is completely automatic, as well as the simultaneous operation of the compressors and gas accumulators and the introduction of the nitrogen as a washing fluid.

At the end of each cycle, the first regenerator 1 is filled with hydrogen-rich coke gas at 10 atm. pressure, another regenerator 3 with 90% hydrogen, and the third regenerator 2 with an $N_2$-CO mixture at 0.5 atm. pressure. The residual hydrogen-rich coke gas from regenerator 1, by opening valves 15a and 15c, is delivered to the cold end of regenerator 3 with its pressure reduced to 6.5 atm. Valve 15c is then closed and valve 15b is opened, thereby delivering additional gas to regenerator 2 with its pressure reduced from 6.5 atm. to 3 atm. The gas at 3 atm. which still remains in regenerator 1 flows through the warm end of regenerator 1 and is returned to the suction conduit of the coke-oven gas compressor as long as such gas is rich in hydrogen. Another portion (consisting of about 2 to 2.5% of the coke-oven gas being processed), together with the revaporized methane, passes into the so-called "rich gas" as soon as said portion has been made hydrogen-poor. The latter portion increases with the working pressure. It then becomes smaller when the last portion of the hydrogen is expanded over the cold end of the regenerator and a heat exchanger to 1 atm. is accumulated, and then returned under increased pressure to the coke gas or crude hydrogen.

During the switching of the regenerators the coke-gas compressor 4 is in continuous operation without interruption. The hydrogen compressor 24 is supplied during a few seconds with hydrogen from a previously filled hydrogen container until the regenerator behind the hydrogen expansion turbine is again brought up to the suction pressure of the hydrogen compressor 24.

The pressure in front of and behind the expansion turbine 13 drops for a few seconds when the low pressure side of regenerator 3 is disconnected and joined to regenerator 2 (pressure 0.5 atm.), while at the same time the hydrogen flowing from generator 1 to the turbine 13 will diminish in pressure. A few seconds later, both pressures will again have risen, in the regenerator 2 to 3 atm., while gas under pressure from the regenerator 3 flows to the turbine.

Figure 1A:
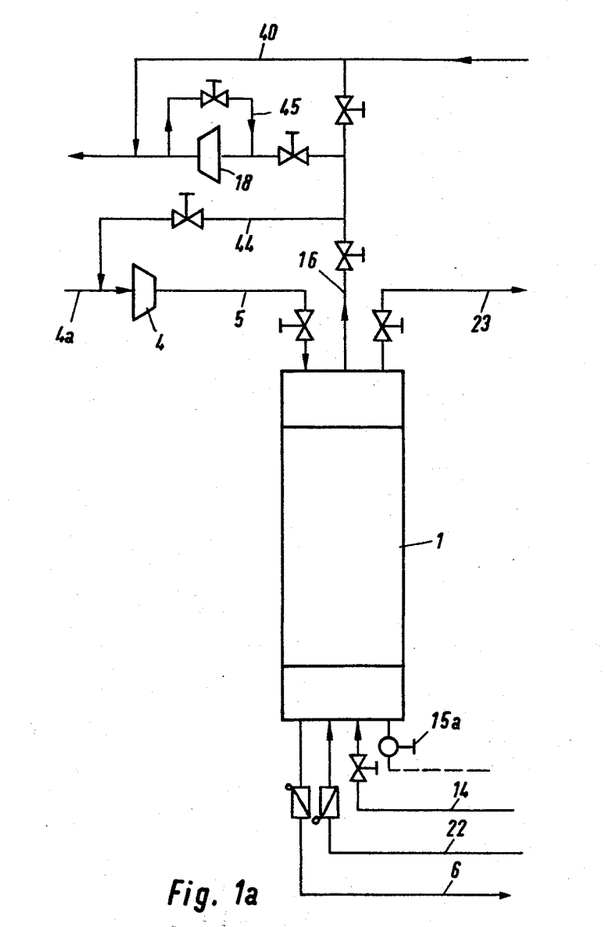

The operation of the regenerator change-over is illustrated in detail in FIGURE 1a, where all the conduits connected thereto are shown, while in FIGURE 1 they are omitted for the sake of clarity.

While the gas content of regenerator 1 is being emptied, partly through conduits 16 and 44 into the coke-gas suction conduit 4a ($H_2$-rich portion) and partly through conduit 16 into the "rich gas" conduit 40 ($H_2$-poor portion), the suction blower 18 will be operating in the bypass 45, and after closure of this bypass, will remove the vaporized condensate from the regenerator 1 when the pressure therein has dropped to about 1.05 atm.

The crude hydrogen loaded with condensate residues which leaves the regenerator 3 (see FIGURE 1) through conduit 23 is brought by the compressor 24 to the pressure of the nitrogen wash about 13 atm., and is then delivered by conduit 25 to heat exchanger 26 and from there through conduit 27 to the heat exchanger 21 where it is cooled to a low temperature, about −188° C. The crude hydrogen then passes through conduits 28 and 30 and separator 29 and then into the nitrogen wash column 19 where it encounters liquid nitrogen introduced from above. This nitrogen was brought by compressor 31 to the pressure in the wash column and then delivered by conduit 32 to the heat exchanger 33 where it was cooled in indirect countercurrent relation to (a) the sump product from the wash column that had been passed through conduit 20 provided with a throttle valve before being vaporized in the heat exchanger 21 and (b) a portion of the synthesis-clean $H_2$-$N_2$ mixture, and from there by conduit 34 through heat exchangers 11, 21 and 35 wherein the nitrogen was further cooled.

Conduit 36 connects heat exchangers 21 and 35 with the wash column 19. From the head of this column a synthesis-clean $H_2$-$N_2$ mixture is removed by the conduit 41 which leads to heat exchanger 26 and also by a branch conduit 42 to heat exchanger 33 in which the mixture is warmed and from which it can be removed by conduit 43. Traces of water and carbon dioxide are removed by adsorbers during their separation from the crude hydrogen. Most of the methane is removed from the crude hydrogen in the heat exchanger 21 and in the separator 29 before entering the wash column and is again vaporized in the heat exchanger 35, after being passed through conduit 37 provided with a throttle valve, so that the CO-$N_2$ mixture in the sump will be sufficiently free from methane to enable it to vaporize solid methane in the regenerator 2. Washing with liquid nitrogen has its usual purpose.

With such an installation there will be produced an hourly yield of 40,700 Nm.³ of a mixture of 75% $H_2$ and 25% $N_2$, and also 23,500 Nm.³ "rich gas" with a heating value of 6,200 kcal. per Nm.³. 160×10⁶ kcal. will be left available for being sold. The energy consumption that is required for the production of the synthesis gases is only 75% of the energy that is required for classical installation.

EXAMPLE 2

By gasification of bituminous coal at 6 atm. with an air and oxygen mixture containing 28% $O_2$, and reaction with water vapor, a converter gas is produced which contains 27.7% $CO_2$, 38.5% $H_2$, 3% CO, 2% $CH_4$ and 29.4% $N_2$. From 40,800 Nm.³ converter gas at 5.5 atm. pressure, 16,500 Nm.³ crude hydrogen containing 91% $H_2$, 3% CO, 5.5% $N_2$ and 0.6% $CH_4$ are separated in a regenerator system. After the necessary preheating in the hollow coil 9 and/or in heat exchanger 11, the gaseous mixture is then expanded in the turbine 13 to 1.4 atm. while doing work, is warmed in the regenerator 3, compressed in the compressor 24 to 13 atm., and after additional cooling in heat exchangers 26 and 21, is washed with liquid nitrogen in the washing column 19 for conversion into the synthesis mixture $H_2+N_2$. The CO-$N_2$ mixture that has collected in the sump of the washing column is vaporized in the heat exchanger 21 in countercurrent relation to the crude hydrogen and the pure nitrogen, is warmed, and then added to the residual gas, which is formed in regenerator 2 by vaporization of 11,350 Nm.³ $CO_2$ with 500 Nm.³ $CH_4$, 500 Nm.³ CO and 750 Nm.³ $H_2$ and 11,300 Nm.³ $N_2$. The gaseous current of 29,500 Nm.³.

$$H_2+N_2+CO+CH_4$$

from which 11,350 Nm.³ $CO_2$ are separated during the loading of regenerator 1, has under a pressure of 5.4 atm. an effective volume of 5,480 m.³. During revaporization, 12,300 Nm.³ $N_2+CO+CH_4$ with an average pressure of 0.75 atm. will stream over the $CO_2$ condensate with an effective volume of 16,400 m.³ (temperature effects not being taken into consideration in these two cases). By the sublimation ratio of 16,400/5480=3, complete evaporation of the $CO_2$ is assured. The energy consumption for the same amount of ammonia produced is 10% higher here than in Example 1. The cost per unit of heat of hydrogen gas from bituminous coal is, however, ⅓ less than from coke-oven gas, and that is decisive for the price of synthesis gas.

EXAMPLE 3

A gas produced by vaporization of fuel oil with subsequent conversion contains 34.4% $CO_2$, 0.2% $H_2S$, 62.2% $H_2$ and 3.2% $N_2+CH_4+CO$.

For more effective sublimation of the $CO_2$ in the regenerator, enough air is added to the oxygen to increase the amount of $N_2+CO+CH_4$ to 9%. If the mixture (32.5% $CO_2$, 58.5% $H_2$ and 9% $N_2+CO+CH_4$) is fractionated in a regenerator under 10 atm. and the condensate again vaporized under 0.5 atm., the sublimation ratio of the effective volumes of the vapor and the condensate will be increased threefold compared to the sublimation ratio prior to the addition of air, and is therefore more favorable. The more air is added, the less $CO_2$ will be carried with the crude hydrogen to the $N_2$-wash.

EXAMPLES 4 AND 5

Further examples show that with use of the same starting materials, e.g. coke-oven gas, in three different procedures, the amount of coke-oven gas that is used and the amount, the heating value and the density of the residual gas that can be offered for sale, can be varied within wide limits.

Example 1 related to an hourly production of 30,000 Nm.³ $H_2$ (heat of combustion 3000 kcal./Nm.³) in 40,000 Nm.³ $H_2$-$N_2$ mixture from 53,000 Nm.³ coke-oven gas (heat of combustion 4,750 kcal./Nm.³) and 11,000 Nm.³ $N_2$. During that process 23,000 Nm.³ of residual gas were produced (heat of combustion 6,800 kcal./Nm.³).

Attention is now directed to the following table, and the ensuing discussion thereof.

TABLE

| | Coke-oven gas, Nm.³ | | Applied heat, kcal./10⁶ | Hydrogen, Nm.³ | Useful heat, kcal./10⁶ | Total residual gas incl. (CO+N²) Fr. | | Residual heat, kcal./10⁶ |
|---|---|---|---|---|---|---|---|---|
| | | | | | | Nm.³ | kcal./Nm.³ / O³ | |
| (A) | 53,000 | | 252 | 30,000 | 90 | 23.5 | --- | 160 |
| (B) | 1. Partial current | 32,600 | --- | 18,700 | --- | 14,300 | 6.800 | --- |
| | 2. Partial current ($H_2+CO_2$) | 8,150 (16,350) | --- | 11,300 | --- | 5,050 | 1.127 | --- |
| | | 40,750 | 193 | 30,000 | 90 | 19,350 | 5.300 | 103 |
| (C) | Coke-oven gas | 18,800 | --- | 10,800 | --- | 8,200 | 6.8 | --- |
| | 1. Partial current $CH_4+H_2O$ | 13,700 | --- | 19,200 | --- | 6,060 | 2.0 | --- |
| | 2. Partial current | 32,500 | --- | 30,000 | --- | 14,260 | --- | 68.2 −27.2 |
| | | | 155 | | 90 | Expenditure and loss during conversion 7,150 | --- | 41.0 |

Section A of the table shows these amounts of materials and their heating values separated into starting materials, hydrogen and residual gas.

Section B relates to the process in which a partial stream of 32,600 Nm.³ coke-oven gas is first introduced into the regenerator, and to which is then added a second partial stream of 16,350 Nm.³ converter $H_2$-$CO_2$ gaseous mixture obtained from 8150 Nm.³ coke-oven gas and 2040 Nm.³ $O_2$ with the addition of 0.85 t. coke and 500 Nm.³ steam. The oxygen was obtained from the air-fractionation plant from which the nitrogen was also obtained. The relative amounts of the two partial currents were so chosen that the heat of combustion of the residual gas from the regenerators and from the nitrogen wash $H_2=5,300$ kcal. and the density of the residual gases, relative to air, is 0.72.

Section C of the table relates to the production of the second partial stream by oxidative conversion of 13,700 Nm.³ coke-oven gas with steam at about 700° C. with subsequent conversion of the CO to 25,260 Nm.³ $H_2+CO_2$, which then together with the first partial stream of 18,800

Nm.$^3$ coke-oven gas is delivered to the regenerators to which only 155×10$^6$ kcal. are delivered, hence 100×10$^6$ kcal. less than in process A. Accordingly, 68×10$^6$ kcal. are left in 14,260 Nm.$^3$ residual gas, whose density is so great that its burning properties, based on the quotient $H_0/d$, in spite of the heat of combustion of 4,800 kcal., are not satisfactory.

From the regenerator rich-gas fraction of 11,090 Nm.$^3$ with a heat of combustion of 5,720 kcal. and a molecular weight of 23.5, good burning characteristics are to be expected. The CO-N$_2$ fraction is, therefore, not combined with the rich gas, but is used separately to provide the heat that is needed for the CH$_4$ conversion. The regenerator rich-gas is drawn upon only to make up the 27.2 kcal. deficiency. For purpose of sale there are available 41×10$^6$ kcal. in 7,150 Nm.$^3$ rich-gas fraction with 5,720 kcal. per Nm.$^3$ with the desired burning characteristics. A comparison with the 160×10$^6$ kcal. with 6,800 kcal. per Nm.$^3$, which is produced without the partial stream for purpose of sale, shows that for commercialization of the process of Example 1 there is a good possibility of selling much larger amounts of high heat gas, while the partial stream methods are advantageous where only gas with normal heating value has a market.

It is to be understood, furthermore, that the use of a partial stream is not limited to methods in which coke-oven gas is used as the starting material.

Figure 2:
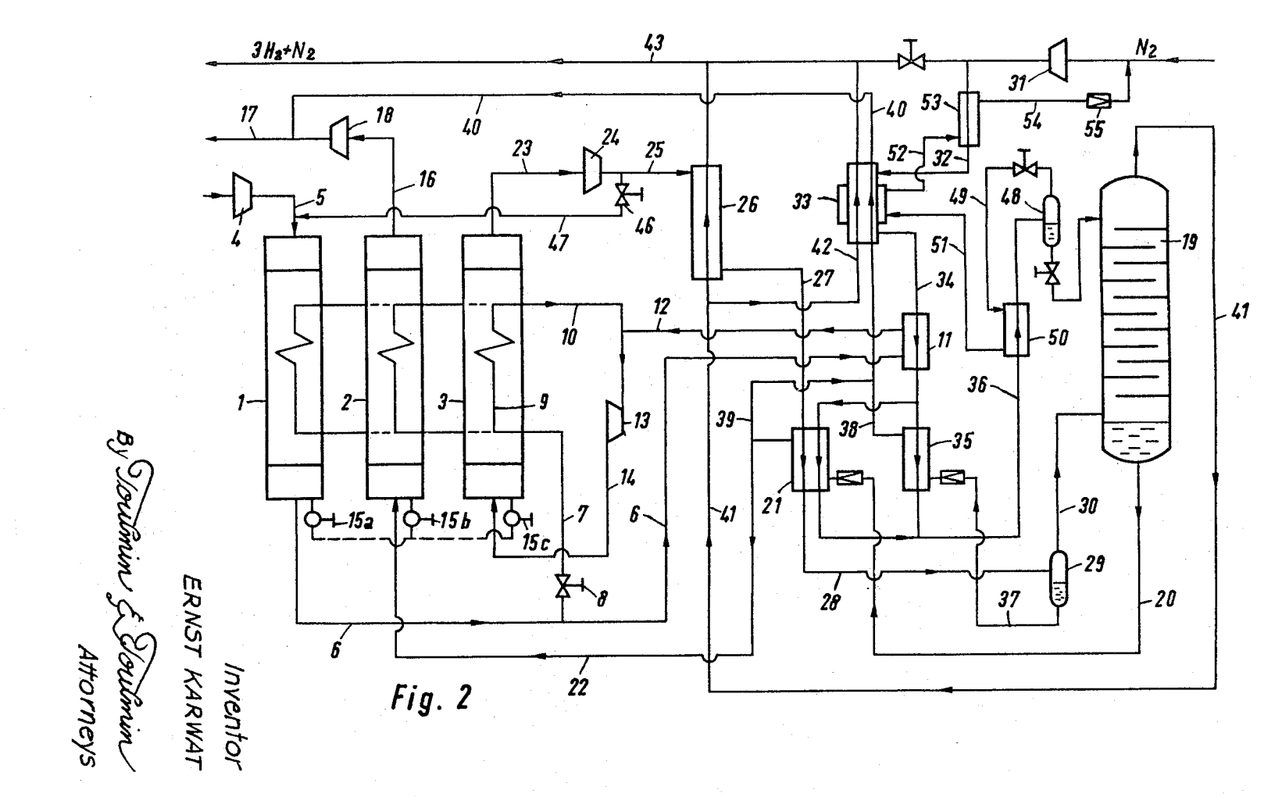

FIGURE 2 shows schematically a modified installation in which there is described the extra features necessary for the circulation of crude hydrogen or nitrogen when the rate of input gas varies with time.

In FIGURE 2 the parts that are designated by reference numerals 1 to 45 are identical with the corresponding parts in FIGURE 1.

If there is a diminution of the amount of hydrogen-containing gas mixture that passes through the compressor 4 and conduit 5 for delivery to regenerator 1, then a portion of the crude hydrogen which has passed through the compressor 24 is allowed to pass through valve 46 and conduit 47 to be returned to conduit 5. This additional hydrogen then flows in a closed circuit comprising regenerator 1, conduit 6, heat exchanger 11, conduit 12, expansion turbine 13, conduit 14 and regenerator 3, from which it is returned to the compressor 24 for continuation in the closed circuit.

The nitrogen which is needed for initially warming the additional hydrogen in the heat exchanger 11 is drawn in the gaseous state from the separator 48 and after passage through conduit 49, heat exchanger 50, conduit 51, heat exchanger 33, conduit 52, heat exchanger 53, conduit 54 and throttle valve 55, is returned to the nitrogen in the conduit leading to the compressor 31.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims. In particular, the term "regenerators" is to be considered the full equivalent of reversible heat exchangers.

What is claimed is:

1. In a process for the production of a CO-free H$_2$N$_2$ gas mixture, particularly of NH$_3$-synthesis gas, from a hydrogen-containing gaseous mixture in which hydrogen as a main constituent is accompanied by one or more of hydrocarbons, oxygen compounds of carbon, nitrogen, moisture, and sulfide impurities, which process comprises the steps of cooling under pressure such a gas mixture in a first regenerator, thereby separating condensables at a substantial low temperature by partial condensation from said gaseous mixture to obtain a crude hydrogen fraction, and washing the thus separated crude hydrogen fraction with liquid nitrogen to form a CO-free gaseous mixture of hydrogen and nitrogen and simultaneously dissolving CO in the liquid nitrogen,
  the improvement comprising a step preceding said washing of the thus separated crude hydrogen fraction of:
  passing said thus separated crude hydrogen fraction through a second regenerator which was traversed during a previous cycle by said hydrogen-containing gaseous mixture, to warm said thus separated crude hydrogen fraction and to cool said second regenerator.

2. The process of claim 1, further comprising the step of passing at least a portion of the crude hydrogen fraction from the first regenerator in indirect heat exchange relationship with compressed nitrogen to be used in the washing step, thereby cooling said compressed nitrogen.

3. The process as defined by claim 2, further comprising the step of passing a portion of resultant cooled gaseous nitrogen to the suction side of a compressor employed for compressing said compressed nitrogen to be used in the washing step.

4. The process as defined by claim 2, further comprising the step of passing the warmed crude hydrogen fraction in indirect heat exchange relationship with the gaseous mixture of nitrogen and hydrogen from the washing step to recool said crude hydrogen fraction prior to being washed.

5. The process of claim 1, wherein the hydrogen-containing gaseous mixture is derived from the combination of at least two separate streams, each separate stream having a different composition.

6. The process as defined by claim 5, further comprising the step of passing the warmed crude hydrogen fraction in indirect heat exchange relationship with the gaseous mixture of nitrogen and hydrogen from the washing step to recool said crude hydrogen fraction prior to being washed.

7. The process of claim 1, further comprising the step of recycling into the hydrogen-containing gaseous mixture gas content of said first regenerator at the end of a switching period as long as said gas is rich in hydrogen.

8. The process as defined by claim 7, further comprising the step of passing the warmed crude hydrogen fraction in indirect heat exchange relationship with the gaseous mixture of nitrogen and hydrogen from the washing step to recool said crude hydrogen fraction prior to being washed.

9. The process as defined by claim 1, further comprising the step of passing the warmed crude hydrogen fraction in indirect heat exchange relationship with the gaseous mixture of nitrogen and hydrogen from the washing step to recool said crude hydrogen fraction prior to being washed.

10. The process as defined by claim 1, comprising the further step of vaporizing the stream containing dissolved CO in liquid nitrogen, and passing at least a portion of said CO-N$_2$ mixture through a third regenerator to scavenge impurities therefrom.

11. The process of claim 1, further comprising the step of expanding the crude hydrogen fraction before it is passed through said second regenerator, whereby cold is produced.

12. The process of claim 11 wherein the expanding step is conducted while doing external work.

13. The process as defined by claim 12, further comprising the step of passing the warmed crude hydrogen fraction in indirect heat exchange relationship with the gaseous mixture of nitrogen and hydrogen from the washing step to recool said crude hydrogen fraction prior to being washed.

14. The process as defined by claim 11, further comprising the step of passing the warmed crude hydrogen fraction in indirect heat exchange relationship with the gaseous mixture of nitrogen and hydrogen from the washing step to recool said crude hydrogen fraction prior to being washed.

15. The process of claim 11, further comprising the step of passing at least a portion of the crude hydrogen fraction from the first regenerator in indirect heat exchange relationship with compressed nitrogen to be used in the washing step, thereby cooling said compressed nitrogen.

16. The process as defined by claim 15, further comprising the step of passing the warmed crude hydrogen fraction in indirect heat exchange relationship with the gaseous mixture of nitrogen and hydrogen from the washing step to recool said crude hydrogen fraction prior to being washed.

17. The process of claim 11, further comprising the step of compressing the expanded crude hydrogen fraction after it is passed through said second regenerator.

18. The process of claim 17 wherein a portion of said compressed crude hydrogen is recycled into the compressed hydrogen-containing gaseous mixture.

19. The process as defined by claim 17, further comprising the step of passing the warmed crude hydrogen fraction in indirect heat exchange relationship with the gaseous mixture of nitrogen and hydrogen from the washing step to recool said crude hydrogen fraction prior to being washed.

20. The process as defined by claim 18, further comprising the step of passing the warmed crude hydrogen fraction in indirect heat exchange relationship with the gaseous mixture of nitrogen and hydrogen from the washing step to recool said crude hydrogen fraction prior to being washed.

21. In a process for the production of a CO-free $H_2$-$N_2$ gas mixture, particularly of $NH_3$-synthesis gas, from a hydrogen-containing gaseous mixture in which hydrogen as a main constituent is accompanied by one or more of hydrocarbons, oxygen compounds of carbon, nitrogen, moisture, and sulfide impurities, which process comprises the steps of cooling under pressure such a gas mixture in a first regenerator, thereby separating condensables at a substantial low temperature by partial condensation from said gaseous mixture to obtain a crude hydrogen fraction, and washing the thus separated crude hydrogen fraction with liquid nitrogen to form a CO-free gaseous mixture of hydrogen and nitrogen and simultaneously dissolving CO in the liquid nitrogen, the improvement comprising:
conducting said cooling step in a first one of at least three cyclically interchangeable regenerators;
expanding the crude hydrogen fraction, whereby cold is produced;
passing resultant cold crude hydrogen fraction before being washed through at least one other of said regenerators, said other regenerator being previously cleaned of impurities, to heat said crude hydrogen fraction, and cool said other regenerator; and then
passing the heated crude hydrogen fraction in indirect heat exchange relationship with the gaseous mixture of nitrogen and hydrogen from the washing step to recool said crude hydrogen fraction prior to being washed.

22. The process of claim 21 wherein the expanding step is conducted while doing external work.

23. The process as defined by claim 21, further comprising the step of compressing expanded crude hydrogen fraction after it is passed through said other regenerator.

24. The process of claim 23 wherein a portion of said compressed crude hydrogen is recycled into the compressed hydrogen-containing gaseous mixture.

25. In a process for the production of a CO-free $H_2$-$N_2$ gas mixture, particularly of $NH_3$-synthesis gas, from a hydrogen-containing gaseous mixture in which hydrogen as a main constituent is accompanied by one or more of hydrocarbons, oxygen compounds of carbon, nitrogen, moisture, and sulfide impurities, which process comprises the steps of cooling under pressure such a gas mixture in a first regenerator, thereby separating condensables at a substantial low temperature by partial condensation from said gaseous mixture to obtain a crude hydrogen fraction, and washing the thus separated crude hydrogen fraction with liquid nitrogen to form a CO-free gaseous mixture of hydrogen and nitrogen and simultaneously dissolving CO in the liquid nitrogen, the improvement comprising:
conducting said cooling step in a first one of at least three cyclically interchangeable regenerators;
passing at least a portion of the crude hydrogen fraction from the first regenerator in indirect heat exchange relationship with compressed nitrogen to be used in the washing step, thereby cooling said compressed nitrogen;
passing the crude hydrogen fraction before being washed through at least one other of said regenerators, said other regenerator being previously cleaned of impurities, to heat said crude hydrogen fraction, and cool said other regenerator; and then
passing the heated crude hydrogen fraction in indirect heat exchange relationship with the gaseous mixture of nitrogen and hydrogen from the washing step to recool said crude hydrogen fraction prior to being washed.

26. In a process for the production of a CO-free $H_2$-$N_2$ gas mixture, particularly of $NH_3$-synthesis gas, from a hydrogen-containing gaseous mixture in which hydrogen as a main constituent is accompanied by one or more of hydrocarbons, oxygen compounds of carbon, nitrogen, moisture, and sulfide impurities, which process comprises the steps of cooling under pressure such a gas mixture in a first regenerator, thereby separating condensables at a substantial low temperature by partial condensation from said gaseous mixture to obtain a crude hydrogen fraction, and washing the thus separated crude hydrogen fraction with liquid nitrogen to form a CO-free gaseous mixture of hydrogen and nitrogen and simultaneously dissolving CO in the liquid nitrogen, the improvement comprising:
conducting said cooling step in a first one of at least three cyclically interchangeable regenerators;
passing the crude hydrogen fraction before being washed through at least one other of said regenerators, said other regenerator being previously cleaned of impurities, to heat said crude hydrogen fraction, and cool said other regenerator; and then
passing the heated crude hydrogen fraction in indirect heat exchange relationship with the gaseous mixture of nitrogen and hydrogen from the washing step to recool said crude hydrogen fraction prior to being washed; and wherein the hydrogen-containing gaseous mixture is derived from the combination of at least two separate streams, each separate stream having a different composition.

27. In a process for the production of a CO-free $H_2$-$N_2$ gas mixture, particularly of $NH_3$-synthesis gas, from a hydrogen-containing gaseous mixture in which hydrogen as a main constituent is accompanied by one or more of hydrocarbons, oxygen compounds of carbon, nitrogen, moisture, and sulfide impurities, which process comprises the steps of cooling under pressure such a gas mixture in a first regenerator, thereby separating condensables at a substantial low temperature by partial condensation from said gaseous mixture to obtain a crude hydrogen fraction, and washing the thus separated crude hydrogen fraction with liquid nitrogen to form a CO-free gaseous mixture of hydrogen and nitrogen and simultaneously dissolving CO in the liquid nitrogen, the improvement comprising:
conducting said cooling step in a first one of at least three cyclically interchangeable regenerators;
passing the crude hydrogen fraction before being washed through at least one other of said regenerators, said other regenerator being previously cleaned of impurities, to heat said crude hydrogen fraction, and cool said other regenerator;

passing the heated crude hydrogen fraction in indirect heat exchange relationship with the gaseous mixture of nitrogen and hydrogen from the washing step to recool said crude hydrogen fraction prior to being washed; and at the end of a cycle, passing gas in a loaded regenerator from the cold end thereof successively to the two other regenerators until the pressures in all three regenerators are equalized, the gas remaining in said loaded regenerator being delivered from the warm end thereof to the incoming hydrogen-containing gaseous mixture as long as said gas is rich in hydrogen.

28. Apparatus for the production of $NH_3$-synthesis gas, which apparatus comprises:

at least three cyclically interchangeable regenerators for cooling a hydrogen-containing gas;

indirect heat exchange means having a warm and cold side for nitrogen and a warm and cold side for hydrogen, the hydrogen cold side being in communication with an outlet conduit at the cold end of said regenerators, whereby the cooled hydrogen-containing gas can indirectly cool compressed nitrogen;

expansion turbine means having its inlet side in communication with the warm hydrogen side of said indirect heat exchange means, and having its outlet side in communication with a compressor via said regenerators;

said compressor having a pressure side and a suction side, its suction side being in communication with said expansion turbine via said regenerators for compressing the crude hydrogen gas after said gas has cooled one of said regenerators;

wash column means, said wash column means being in communication with the pressure side of said compressor, and also being in communication with said nitrogen cold side of said indirect heat exchange means, whereby the crude hydrogen can be washed by cold liquid nitrogen; and conduit means for effecting all of said communications.

References Cited

UNITED STATES PATENTS

| 2,936,593 | 5/1960 | Grunberg | 62—23 |
| 2,962,867 | 12/1960 | Seidel | 62—30 X |
| 3,083,544 | 4/1963 | Jacob | 62—38 X |
| 3,100,696 | 8/1963 | Becker | 62—38 X |
| 3,105,360 | 10/1963 | Lehmer et al. | 62—13 |
| 3,192,729 | 7/1965 | Becker | 62—13 |
| 3,216,206 | 11/1965 | Kessler | 62—38 X |
| 3,251,189 | 5/1966 | Jakob | 62—13 |

FOREIGN PATENTS 1,141,196  2/1956  France.

NORMAN YUDKOFF, Primary Examiner.

V. W. PRETKA, Assistant Examiner.